United States Patent
Chen et al.

(10) Patent No.: US 11,152,872 B2
(45) Date of Patent: Oct. 19, 2021

(54) DC TO AC CONVERTER AND CONTROL METHOD THEREOF

(71) Applicant: INDUSTRIAL TECHNOLOGY RESEARCH INSTITUTE, Hsinchu (TW)

(72) Inventors: Chien-Yu Chen, Hsinchu (TW); Horng-Jzer Shih, Hsinchu (TW); Kai-Cheung Juang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/993,792

(22) Filed: May 31, 2018

(65) Prior Publication Data

US 2019/0288610 A1    Sep. 19, 2019

(30) Foreign Application Priority Data

Mar. 14, 2018    (TW) .................................. 107108587

(51) Int. Cl.
  *H02M 7/483*    (2007.01)
  *H02M 7/537*    (2006.01)
      (Continued)

(52) U.S. Cl.
  CPC .......... *H02M 7/483* (2013.01); *H02M 7/537* (2013.01); *H02M 7/5387* (2013.01);
      (Continued)

(58) Field of Classification Search
  CPC .. H02M 7/537; H02M 7/483; H02M 7/53806; H02M 7/48; H02M 7/53871;
      (Continued)

(56) References Cited

U.S. PATENT DOCUMENTS

| 5,642,775 A | 7/1997 | Akachi |
| 6,459,596 B1 | 10/2002 | Corzine |

(Continued)

FOREIGN PATENT DOCUMENTS

| CN | 102082523 | 6/2011 |
| CN | 104467007 | 3/2015 |

(Continued)

OTHER PUBLICATIONS

Rodriguez, et al. "Multilevel Inverters: A Survey of Topologies, Controls, and Applications", IEEE Transactions on Industrial Electronics, Aug. 2, 2002 vol. 49, No. 4.

(Continued)

*Primary Examiner* — Jeffrey A Gblende
(74) *Attorney, Agent, or Firm* — Amin, Turocy & Watson, LLP

(57) ABSTRACT

A direct current (DC) to alternating current (AC) converter in accordance with an embodiment includes a battery array module, a battery control module and a polarity converter, wherein the battery array module and the magnetic converter are respectively coupled to the battery control module. The battery array module is used to receive DC signals. The battery array module is controlled by the battery control module to reconfigure and generate a multi-phase step signal. The multi-phase step signal is sent to the polarity converter. The multi-phase step signal is converted into an AC signal output by the polarity converter.

16 Claims, 10 Drawing Sheets

(51) Int. Cl.
*H02M 7/5387* (2007.01)
*H02S 40/32* (2014.01)
*H02M 7/49* (2007.01)

(52) U.S. Cl.
CPC ............ *H02J 2207/20* (2020.01); *H02M 7/49* (2013.01); *H02S 40/32* (2014.12)

(58) Field of Classification Search
CPC ........... H02M 7/5387; H02M 7/53875; H02M 7/003; H02M 7/53835; H02M 7/5381; H02M 7/53846; H02M 3/28; H02M 3/33507; H02M 3/33569; H02M 3/33561; H02M 3/156; H02M 3/33592; H02M 3/3376; H02M 3/337; H02M 3/3372; H02M 3/3378; H02M 3/33523; H02M 3/3384; H02M 1/32; Y02B 70/1433; Y02B 70/126; Y02B 70/1475; Y02B 70/1441; H02J 3/382; H02J 7/0065; H02J 7/022

See application file for complete search history.

(56) References Cited

U.S. PATENT DOCUMENTS

| | | | | |
|---|---|---|---|---|
| 6,847,130 | B1* | 1/2005 | Belehradek | H02J 7/0072 |
| | | | | 307/66 |
| 8,730,691 | B2 | 5/2014 | Paatero | |
| 9,641,098 | B2 | 5/2017 | Fu et al. | |
| 9,660,451 | B1* | 5/2017 | Naiknaware | H02J 3/38 |
| 2008/0013351 | A1* | 1/2008 | Alexander | H02M 3/1582 |
| | | | | 363/123 |
| 2013/0175976 | A1* | 7/2013 | Rana | H02J 7/0016 |
| | | | | 320/107 |
| 2014/0036557 | A1 | 2/2014 | Nondahl et al. | |
| 2014/0070756 | A1* | 3/2014 | Kearns | H02J 7/007 |
| | | | | 320/101 |
| 2015/0085541 | A1 | 3/2015 | Hu et al. | |
| 2016/0268841 | A1* | 9/2016 | Zeier | H02J 7/022 |
| 2017/0264123 | A1* | 9/2017 | Mulawski | H02J 7/0014 |
| 2018/0026550 | A1* | 1/2018 | Dent | H02J 3/383 |
| | | | | 363/56.01 |

FOREIGN PATENT DOCUMENTS

| | | |
|---|---|---|
| CN | 106559004 | 4/2017 |
| TW | 201014146 | 4/2010 |
| TW | 201327404 | 7/2013 |
| TW | I404320 | 8/2013 |
| TW | 201340537 | 10/2013 |
| TW | I439008 | 5/2014 |
| TW | 201436445 | 9/2014 |
| TW | I516011 | 1/2016 |

OTHER PUBLICATIONS

Nordvall, "Multilevel Inverter Topology Survey", Department of Energy and Environment Division of Electric Power Engineering Chalmers University of Technology, 2011.

Singaravelu, et al. "Design and Implementation of Seven Level Cascaded H-Bridge Inverter Using Low frequency transformer with Single DC Source", International Journal of Engineering and Technology (IJET), 2013, vol. 5 No. 3, 3068-3076.

Dewangan, et al. "Review of an Inverter for Grid Connected Photovoltaic (PV) Generation System", International Journal of Scientific & Technology Research, October 2014, vol. 3, Issue 10.

Du, et al. "A Cascade Multilevel Inverter Using a Single DC Source", IEEE, 2006, 426-430.

Safia, et al. "Design and Simulation of Grid Connected PV system Using Multilevel Inverters", International Journal of Electrical and Electronics Engineering (IJEEE), ISSN (Print), 2013, 2231-5184, vol. 4, Issue-2.

Taiwanese Decision of a Patent Grant for Taiwanese Patent Application No. 107108587 dated Oct. 16, 2018.

Chinese Office Action for Chinese Patent Application No. 201810420708.0 dated Feb. 6, 2020.

Chinese Office Action for Chinese Patent Application No. 201810420708.0 dated Aug. 18, 2020.

* cited by examiner

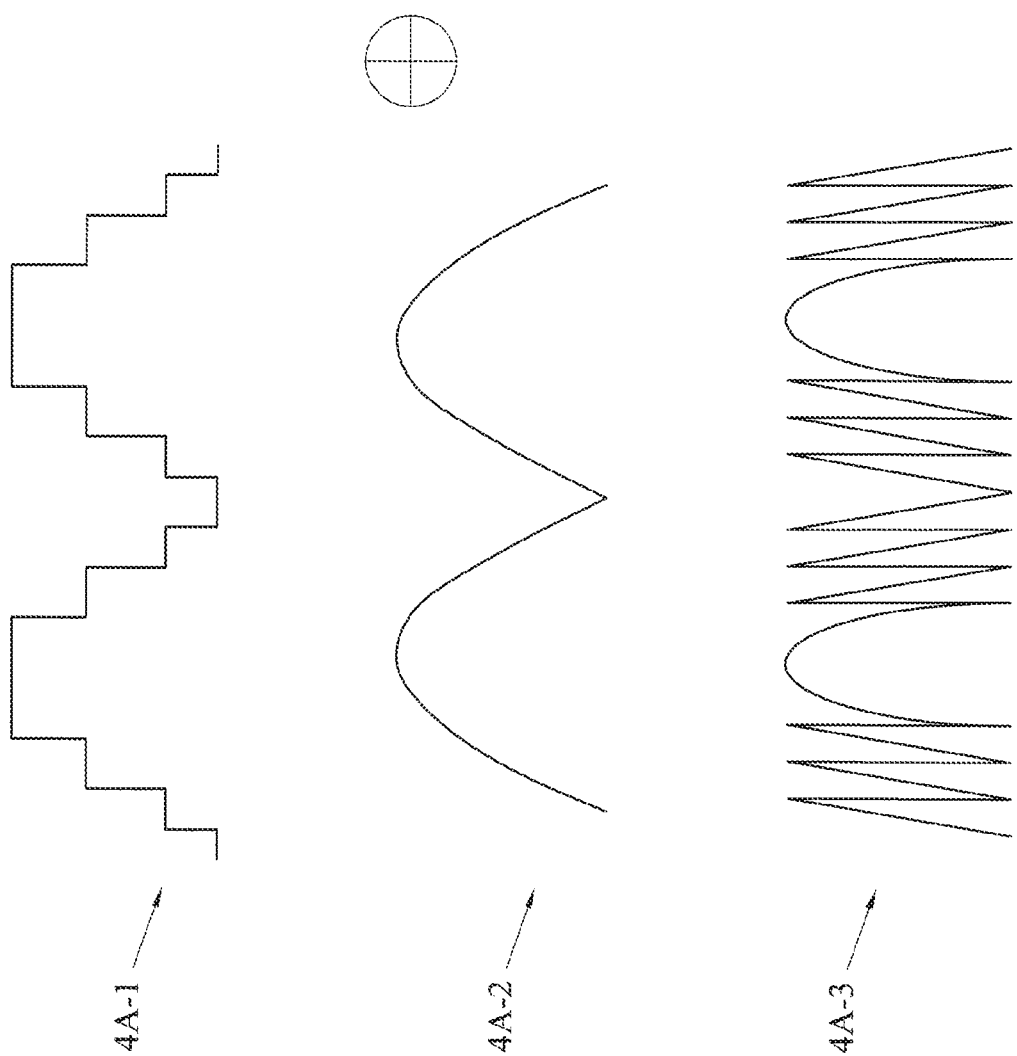

DC TO AC CONVERTER AND CONTROL METHOD THEREOF

CROSS REFERENCE TO RELATED APPLICATION

This application claims the priority benefit of Taiwan application serial no. 107108587, filed on Mar. 14, 2018. The entirety of the above-mentioned patent application is hereby incorporated by reference herein.

TECHNICAL FIELD

The technical field generally relates to a DC to AC (direct current to alternating current) converter and a control method thereof.

BACKGROUND

Nowadays, the issue of green energy is becoming increasingly important. In particular, related industries such as electric cars and electric motor vehicles of electric vehicles continue to flourish. There is a considerable demand of power supplies for electric vehicles. Lithium batteries are widely used products today, which will drive lithium batteries to replace the current lead-acid batteries in the future. With the use of cloud computing and the popularity of network storage devices, power array systems have also been adopted in order to enhance endurance. However, the use of a power array system will result in its corresponding high output voltage. Novel and complex control strategies are needed to be incorporated with the high output voltage. In order to continuously improve the efficiency and the practicality of power management, the design of energy conversion converters plays an important role and needs to be fully considered in the design of the overall system.

The realization of a general multi-level inverter system requires a DC-bus voltage source. The DC bus voltage source is divided by a plurality of series capacitors and is spliced with a plurality of semiconductor switches, and switches the semiconductor switches to achieve multi-phase voltage output. When the order of the required multi-level inverter increases, the number of switching elements and capacitors required by this system increases, resulting in increased cost and complicated control.

Working modes of multi-level inverters are, for example, a grid connected mode, a line interactive mode, or a stand-alone mode. There may be a problem of energy loss for the multi-level inverters under the working modes. Therefore, how to incorporate with a power management system and a power transfer system to maintain the system's optimal application state and integration of energy storage and energy transfer is one of the important issues today.

SUMMARY OF THE DISCLOSURE

According to an embodiment of the disclosure, a direct current (DC) to alternating current (AC) converter comprises a battery array module used to receive a DC signal; a battery control module used to control the battery array module to reconfigure and generate a multi-phase step signal; and a polarity converter used to convert the multi-phase step signal into an AC signal output.

According to an embodiment of the disclosure, a control method for a direct current (DC) to alternating current (AC) converter comprises receiving a DC signal by using a battery array module; reconfiguring and generating a multi-phase step signal by controlling the battery array module with a battery control module; and converting the multi-phase step signal into an AC signal output by using a polarity converter.

The foregoing will become better understood from a careful reading of a detailed description provided herein below with appropriate reference to the accompanying drawings.

BRIEF DESCRIPTION OF THE DRAWINGS

FIG. 4A shows a functional block diagram of a direct current (DC) to alternating current (AC) converter according to yet another embodiment of this disclosure.

DETAILED DESCRIPTION OF DISCLOSED EMBODIMENTS

Figure 1:
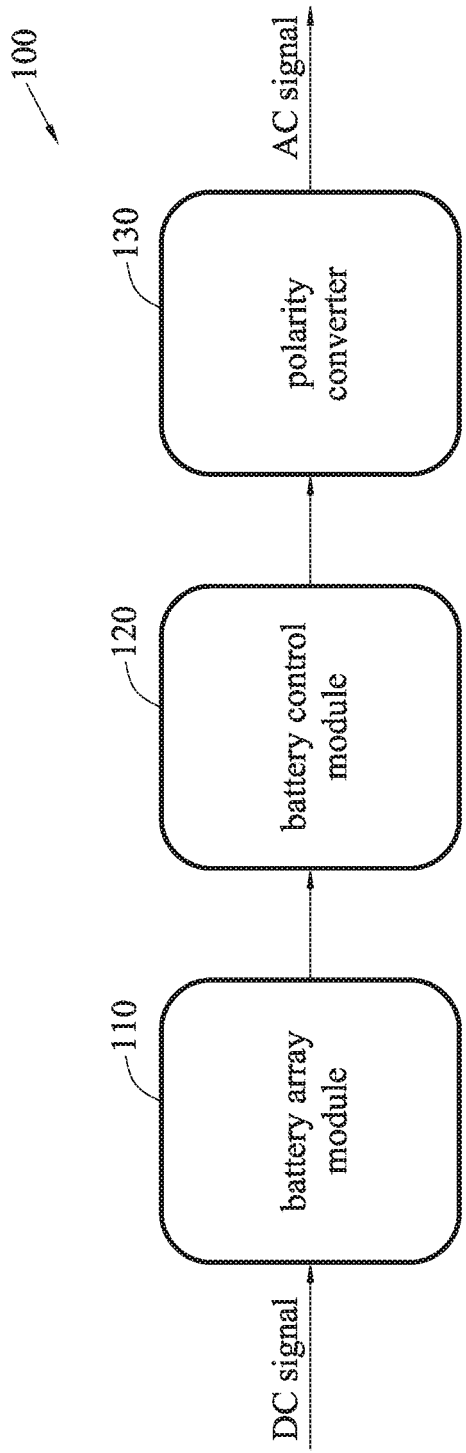
FIG. 1 shows a functional block diagram of a direct current (DC) to alternating current (AC) converter according to an embodiment of this disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a functional block diagram of a direct current (DC) to alternating current (AC) converter 100 according to an embodiment of this disclosure. As shown in FIG. 1, the DC to AC converter 100 comprises a battery array module 110, a battery control module 120 and a polarity converter 130. The battery array module 110 and the polarity converter 130 are coupled to the battery control module 120, respectively. The battery array module 110 is used to receive a DC signal. The battery control module 120 is used to control the battery array module to reconfigure out a multi-phase step signal which is transmitted to the polarity converter 130. The polarity converter 130 converts the multi-phase step signal into an AC signal output.

Figure 2:
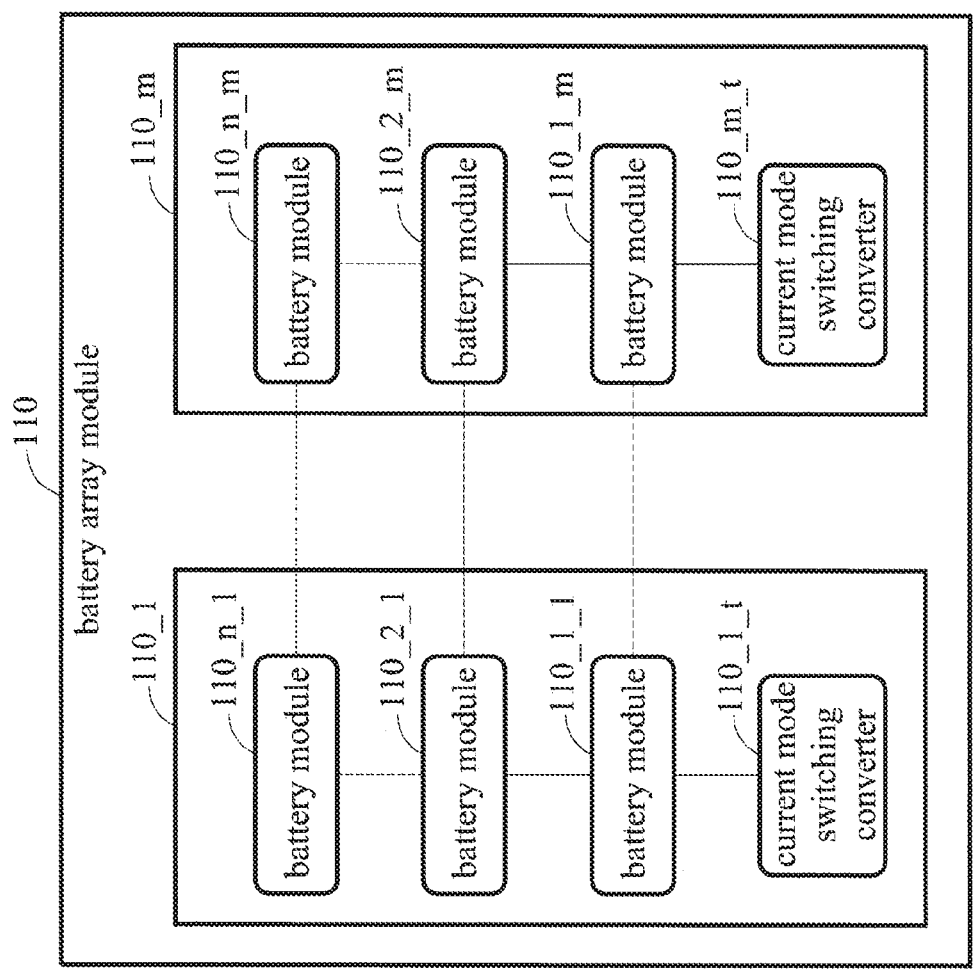
FIG. 2 shows a block diagram of a battery array module according to an embodiment of this disclosure.

FIG. 2 shows a block diagram of the battery array module 110 according to an embodiment of this disclosure. The battery array module 110 comprises one or multiple battery modules $110\_i\_j$, where $i=1, 2, \ldots, n$, $j=1, 2, \ldots, m$, and n and m are positive integers greater than or equal to 1. A plurality of battery string modules 110_1~110_m in series formed by the one or multiple battery modules 110_i_j are controlled by a current mode switching converter 110_m_t. The battery string modules 110_1~110_m are electrically connected in parallel to form the battery array module 110.

Referring to FIG. 1 and FIG. 2, when the battery array module 110 receives a DC signal through a DC receiving terminal, the battery control module 120 generates the multi-phase step signal by increasing the quantity of the plurality of battery string modules 110_1~110_m and decreasing the quantity of the plurality of battery string modules 110_1~110_m. An enable mode or a bypass mode could be used to switch the battery string modules 110_1~110_m for increasing or decreasing the quantity of the battery string modules 110_1~110_m. The multi-phase step signal could be generated by a smooth analog signal approximating the original input signal with an integral processing or a low-pass filter. According to an embodiment, a 4-phase step signal could be generated by the battery control module 120 which controls the battery array module 110 to increase and decrease any five of battery modules 110_1_1~110_n_1. The abovementioned method could be used to generate other different multi-phase step signals and will not be repeated here. The multi-phase step signal is then transmitted to the polarity converter 130 for converting the multi-phase step signal into an AC signal output.

Figure 3A:
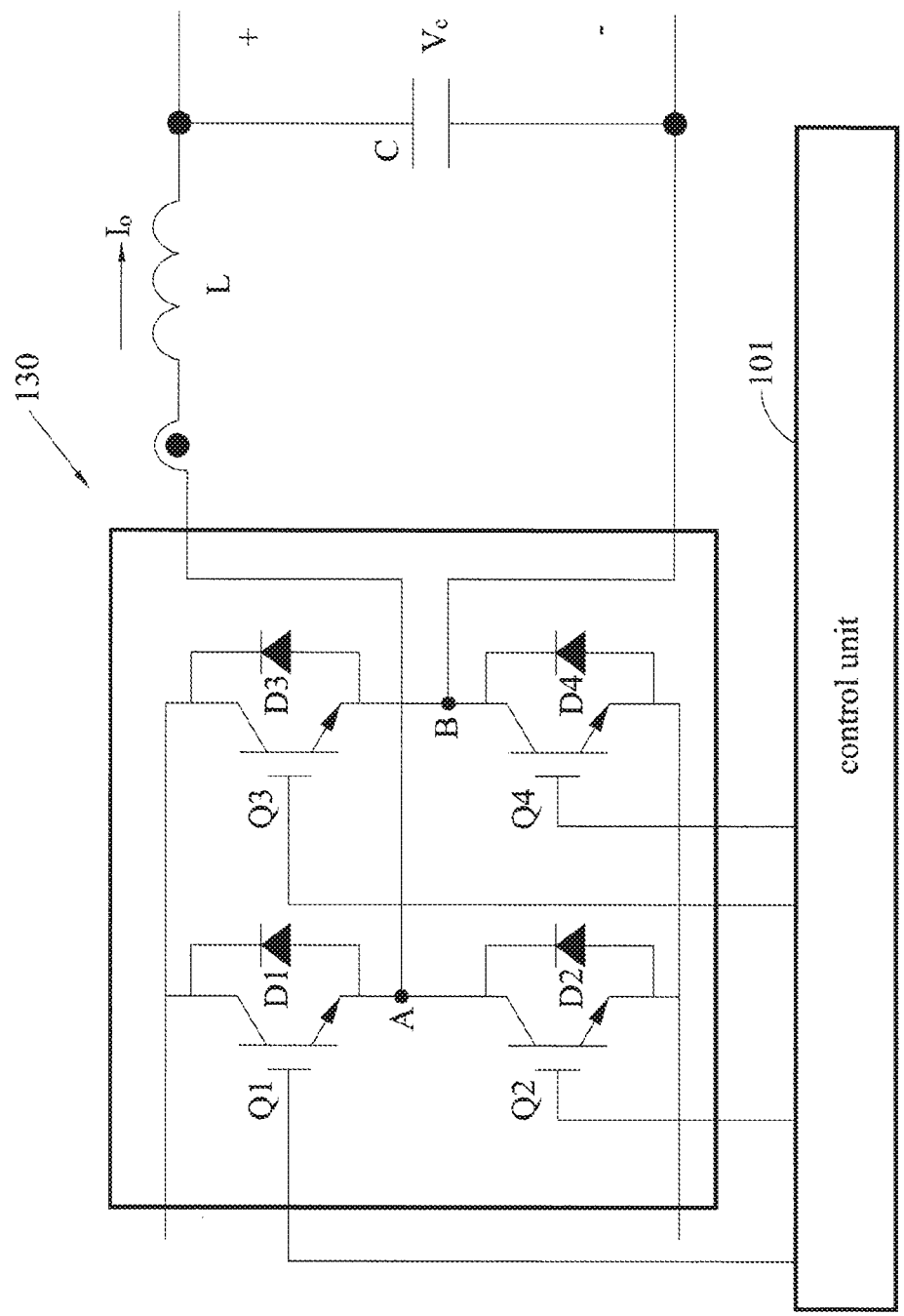
FIG. 3A shows a circuit schematic diagram of a polarity converter according to an embodiment of this disclosure.

FIG. 3A shows a circuit schematic diagram of the polarity converter 130 according to an embodiment of this disclosure. The polarity converter 130 comprises a first power switch Q1, a second power switch Q2, a third power switch Q3, a fourth power switch Q4, an inductor L, a capacitor C, diodes D1~D4 (a first diode, a second diode, a third diode and a fourth diode), and a control unit 101. The first power switch Q1 and the second power switch Q2 are connected to each other in series. The third power switch Q3 and the fourth power switch Q4 are connected to each other in series. The first power switch Q1 and the second power switch Q2 are connected to the third power switch Q3 and the fourth power switch Q4 in parallel. The first power switch Q1, the second power switch Q2, the third power switch Q3 and the fourth power switch Q4 are connected to the control unit 101, respectively. Therefore, the control unit 101 could respectively controls the operations of the first power switch Q1, the second power switch Q2, the third power switch Q3 and the fourth power switch Q4. For example, the control unit 101 controls the turn-on time or the turn-off time of each power switch.

In detailed, each of the first power switch Q1, the second power switch Q2, the third power switch Q3 and the fourth power switch Q4 has a control terminal, a first terminal and a second terminal. The cathode of the diode D1 is electrically connected to the first terminal of the first power switch Q1. The anode of the diode D1 is electrically connected to the second terminal of the first power switch Q1. The cathode of the diode D2 is electrically connected to the first terminal of the second power switch Q2. The anode of the diode D2 is electrically connected to the second terminal of the second power switch Q2. The cathode of the diode D3 is electrically connected to the first terminal of the third power switch Q3. The anode of the diode D2 is electrically connected to the second terminal of the third power switch Q3. Similarly, the cathode of the diode D4 is electrically connected to the first terminal of the fourth power switch Q4. The anode of the diode D4 is electrically connected to the second terminal of the fourth power switch Q4. In addition, the second terminal of the first power switch Q1 is electrically connected to the first terminal of the second power switch Q2. The second terminal of the third power switch Q3 is electrically connected to the first terminal of the fourth power switch Q4. The first terminal of the first power switch Q1 is electrically connected to the first terminal to the third switch Q3. The second terminal of the second power switch Q2 is electrically connected to the second terminal of the fourth power switch Q4. Therefore, the first power switch Q1 and the second power switch Q2 are electrically connected to each other in series. The third power switch Q3 and the fourth power switch Q4 are electrically connected to each other in series.

The control terminals of the first power switch Q1, the second power switch Q2, the third power switch Q3 and the fourth power switch Q4 are electrically connected to the control unit 101, respectively. That is, the control unit 101 could output control signals to the control terminals of the first power switch Q1, the second power switch Q2, the third power switch Q3 and the fourth power switch Q4, so as to control the operation of overall circuit by controlling the turn-on time or the turn-off time for each of the first power switch Q1, the second power switch Q2, the third power switch Q3 and the fourth power switch Q4.

According to an embodiment, the first power switch Q1, the second power switch Q2, the third power switch Q3 and the fourth power switch Q4 could be insulated gate bipolar transistors (IGBTs). Accordingly, the control terminals of the first power switch Q1, the second power switch Q2, the third power switch Q3 and the fourth power switch Q4 are the gates of the insulated gate bipolar transistors. The first terminals of the first power switch Q1, the second power switch Q2, the third power switch Q3 and the fourth power switch Q4 are collectors of the insulated gate bipolar transistors. The second terminals of the first power switch Q1, the second power switch Q2, the third power switch Q3 and the fourth power switch Q4 are emitters of the insulated gate bipolar transistors. However, the first power switch Q1, the second power switch Q2, the third power switch Q3 and the fourth power switch Q4 could be implemented by other types of power transistors such as metal oxide semiconductor field effect transistor (MOSFET).

Figure 3B:
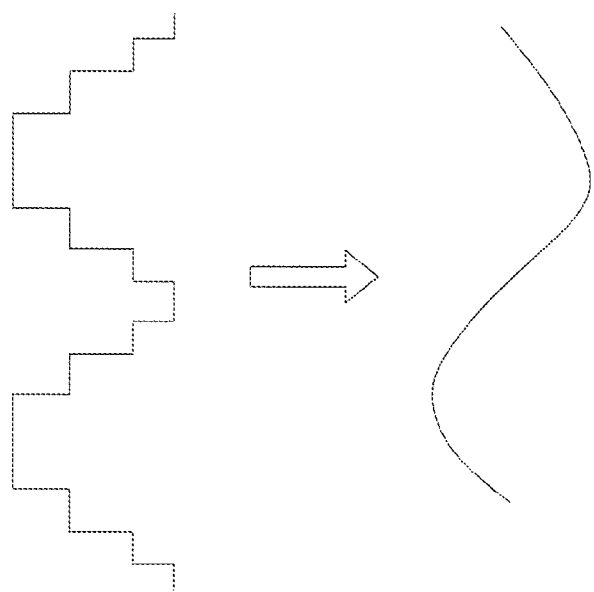
FIG. 3B shows a circuit schematic diagram of a polarity converter according to an embodiment of this disclosure.

As shown in FIG. 3B, a multi-phase step signal is converted into an AC signal output by a signal A (shown in FIG. 3A) from the first terminal of the first power switch Q1 and a signal B (shown in FIG. 3A) from the first terminal of the fourth power switch Q4.

Figure 4:
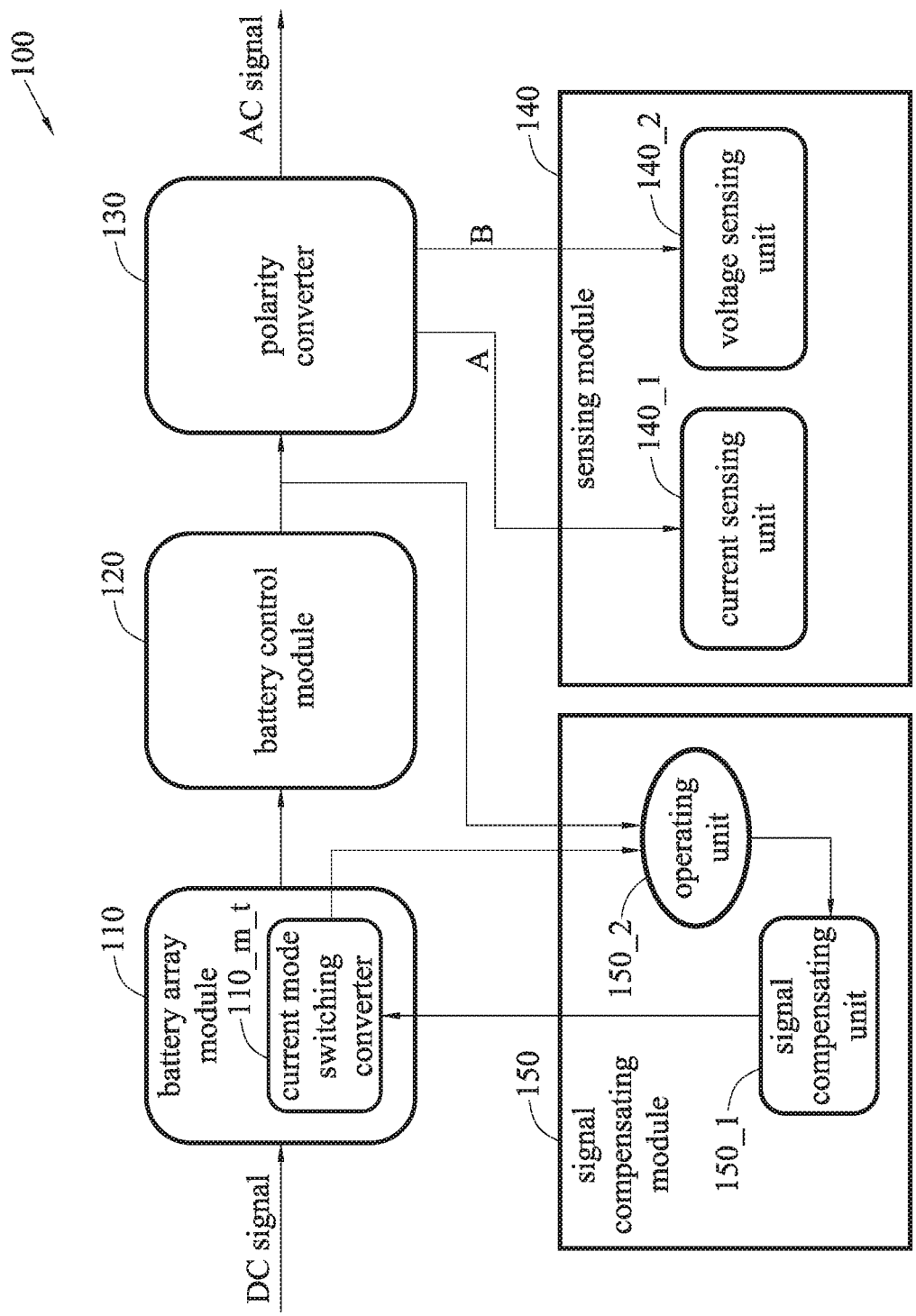
FIG. 4 shows a functional block diagram of a direct current (DC) to alternating current (AC) converter according to another embodiment of this disclosure

Referring to FIG. 4 and FIG. 4A, the DC to AC converter further comprises a signal compensating module 150 for optimizing the multi-phase step signal according to another embodiment of this disclosure. The signal compensating module 150 comprises an operating unit 150_2 and a signal compensating unit 150_1, wherein a first signal 4A-3 is obtained by the operating unit 150_2 which subtracts a predetermined signal 4A-2 from the multi-phase step signal 4A-1. As shown in FIG. 4A, the first signal 4A-3 is represents the portion needed to be compensated. The first signal 4A-3 compensated by the signal compensating unit 150_1 is transmitted to the current mode switching converter are 110_m_t of the battery array module 110.

Referring to FIGS. 1, 3 and 4, the according to yet another embodiment of this disclosure, the DC to AC converter further comprises a sensing module 140, wherein the sensing module 140 comprises a current sensing unit 140_1 and a voltage sensing unit 140_2. The voltage sensing unit 140_2 is used to control each battery module 110_n_1 in the battery string module 110_1, and so on. The current sensing unit 140_1 receives the signal A in the polarity converter 130 while the voltage sensing unit 140_2 receives the signal B in the polarity converter 130. The current sensing unit 140_1 respectively transmits the signal A to the plural battery string modules 110_1~110_m to control the battery string modules 110_1~110_m according to the loading characteristic. The battery string modules 110_1~110_m connected in parallel could be adjusted to avoid the power consumption of the circuit.

In detailed, the current sensing unit 140_1 and the voltage sensing unit 140_2 are respectively connected to the control unit 101. The signal A received by current sensing unit 140_1 could be used to detect the change of the current Io passing through an inductor (that is, the change of the input current). The change of the current Io is transmitted to the control unit 101 for further calculation analysis. The signal B received by the voltage sensing unit 140_2 could be used to detect an output voltage Vc and transmit this output voltage Vc to the control unit 101 for further calculation analysis. The control unit 101 generates control signals with the same frequency to respectively control the turn-on operations or the turn-off operations of the first power switch Q1, the second power switch Q2, the third power switch Q3 and the fourth power switch Q4, according to the change of the circuit current Io detected by the current sensing unit 140_1 and the output voltage Vc detected by the voltage sensing unit 140_2, respectively.

In other words, the control unit 101 controls the operations of the third power switch Q3 and the fourth power switch Q4 according to a current change of an inductor L detected by the current sensing unit 104_1 during a period, a DC voltage level of an output detected by the voltage sensing unit 104_2, and the first signal 4A-3 to be compensated. Please note that this disclosure does not limit the actual implementation of the control unit 101 and the actual control of the third power switch Q3 and the fourth power switch Q.

The current sensing unit could be implemented by a Hall Effect sensing element 140_1 or a resistor. The voltage sensing unit 140_2 could be implemented by a voltage sensor or a voltage divider circuit. The control unit 101 could be is implemented by a programmable microprocessor, such as a digital signal processor (DSP). The load could be changed according to the system architecture applied. For example, in the case of an electric vehicle, the load could be a motor or another alternative load.

Figure 5:
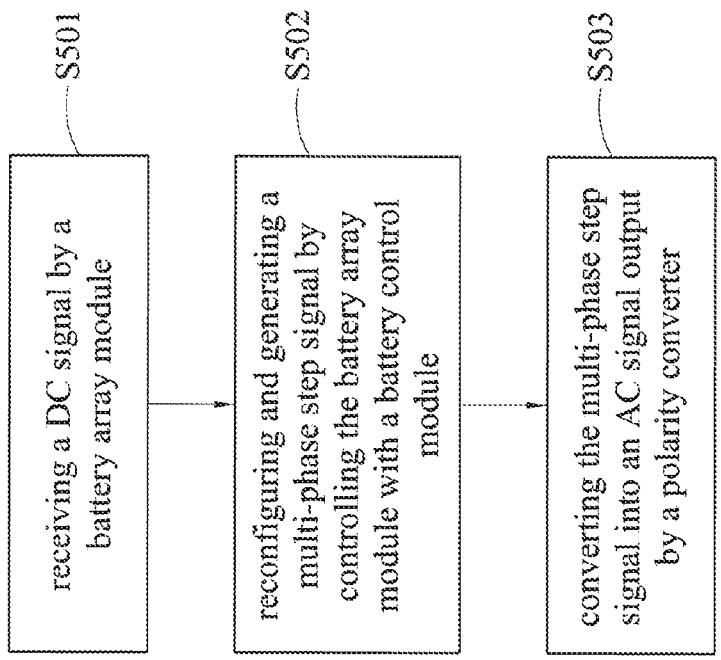
FIG. 5 shows a control method for a direct current (DC) to alternating current (AC) converter according to an embodiment of this disclosure.

According to an embodiment of this disclosure, FIG. 5 shows a flowchart of a control method for a direct current (DC) to alternating current (AC) converter, comprising: receiving a DC signal by using a battery array module (step S501); reconfiguring and generating a multi-phase step signal by controlling the battery array module with a battery control module (step S502); and converting the multi-phase step signal into an AC signal output by using a polarity converter (step S503).

Figure 6:
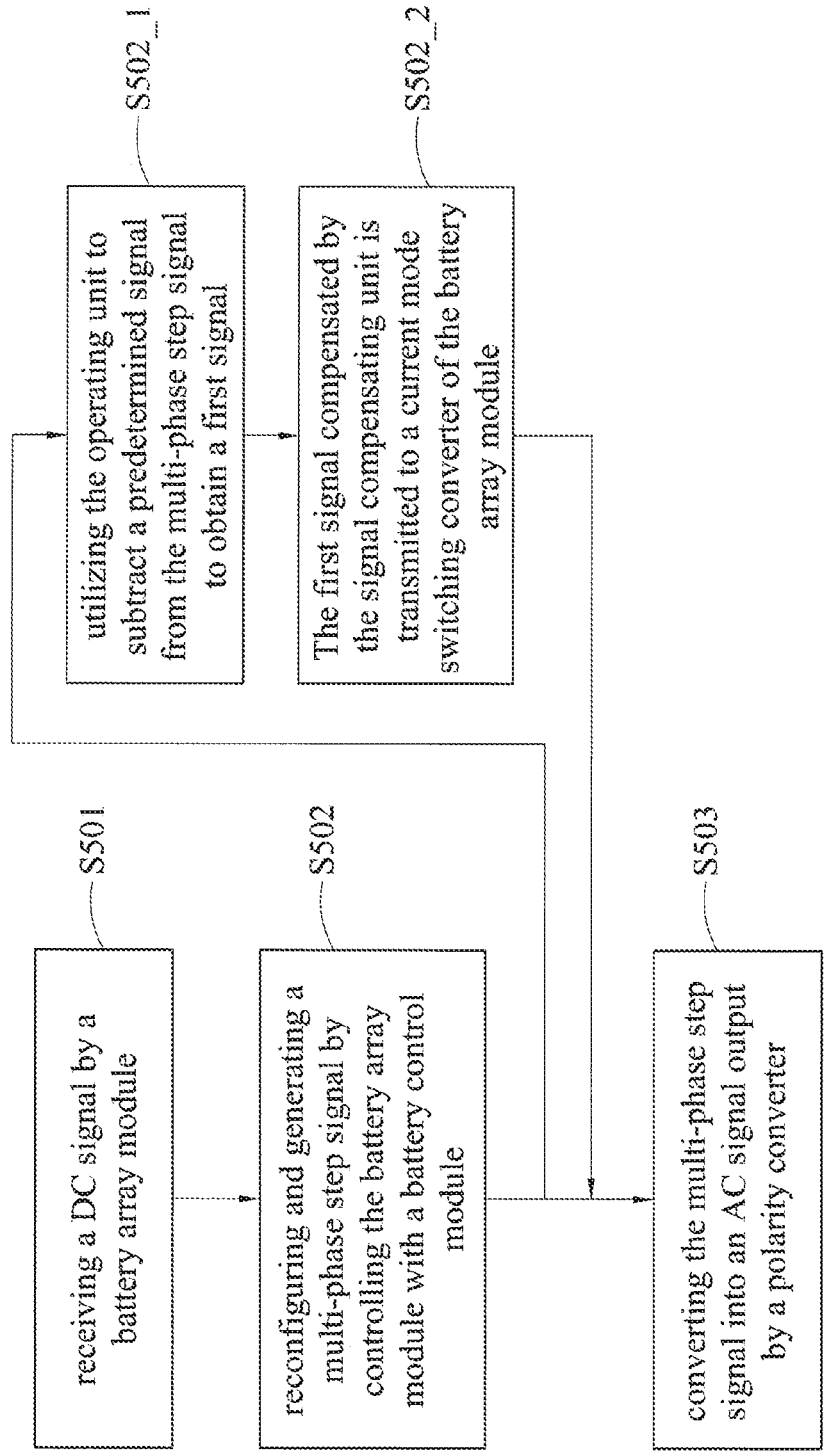
FIG. 6 shows a control method for a direct current (DC) to alternating current (AC) converter according to another embodiment of this disclosure.

According to another embodiment of this disclosure, referring to FIG. 6, the component symbols and partial content of the embodiment in FIG. 5 are used. The same elements are denoted by the same reference numerals. The description of the same technical content is omitted and will not be repeated here. Step S502 further comprises a step of utilizing an operating unit to subtract a predetermined signal from the multi-phase step signal to obtain a first signal (step S502_1). The first signal compensated by the signal compensating unit is transmitted to a current mode switching converter of the battery array module (step S502_2). The polarity converter converts the multi-phase step signal into the AC signal output (step S503).

Figure 7:
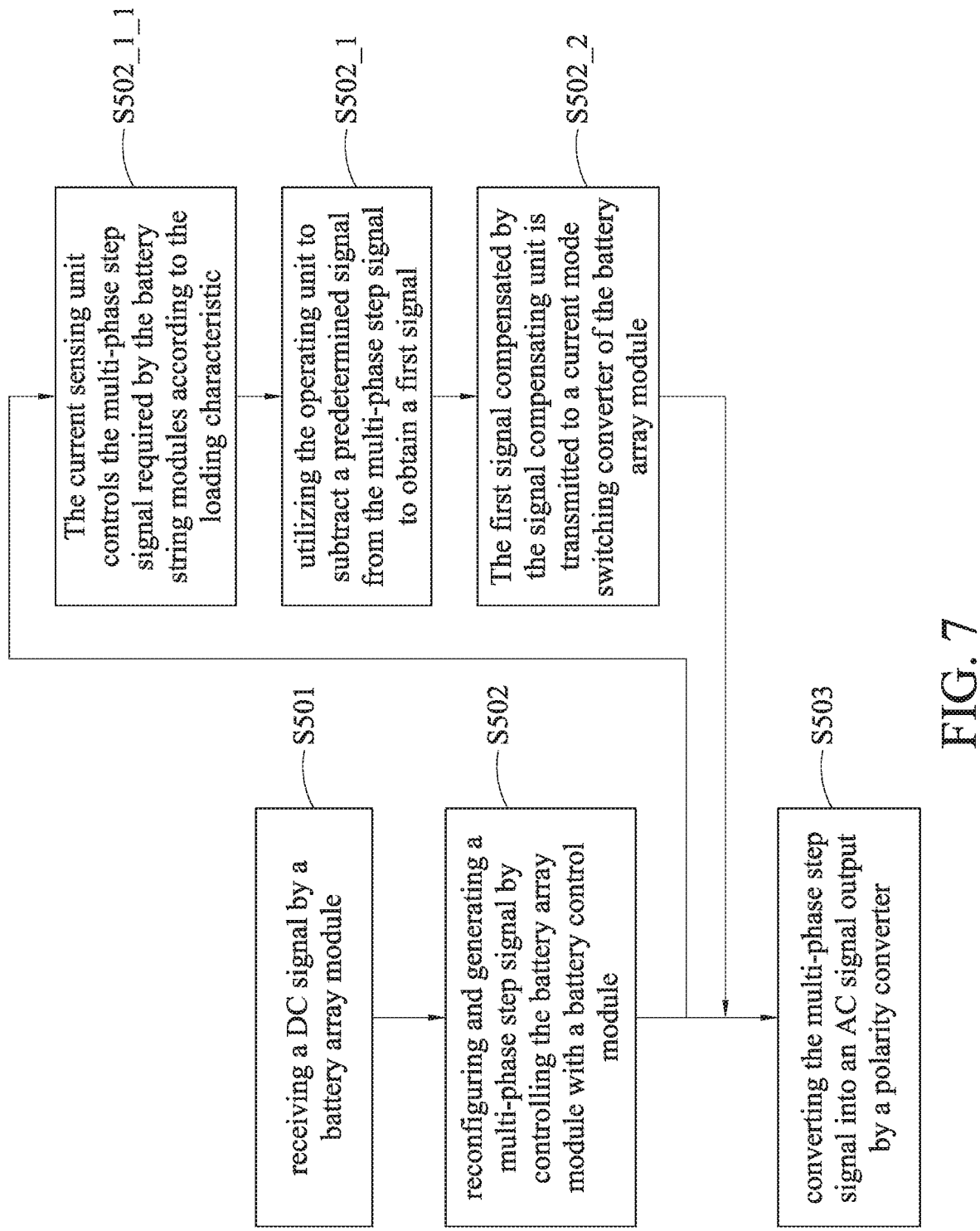
FIG. 7 shows a control method for a direct current (DC) to alternating current (AC) converter according to yet another embodiment of this disclosure.

According to yet another embodiment of this disclosure, referring to FIG. 7, step S502 further comprises a step of utilizing a voltage sensing unit to control each battery module in battery string modules with the multi-phase step signal. A current sensing unit controls the multi-phase step signal required by the battery string modules according to the loading characteristic (step S502_1_1) and subtracts a predetermined signal to obtain a first signal (step S502_1). The first signal compensated by the signal compensating unit is transmitted to a current mode switching converter of the battery array module (step S502_2). The polarity converter converts the multi-phase step signal into the AC signal output (step S503).

Figure 8:
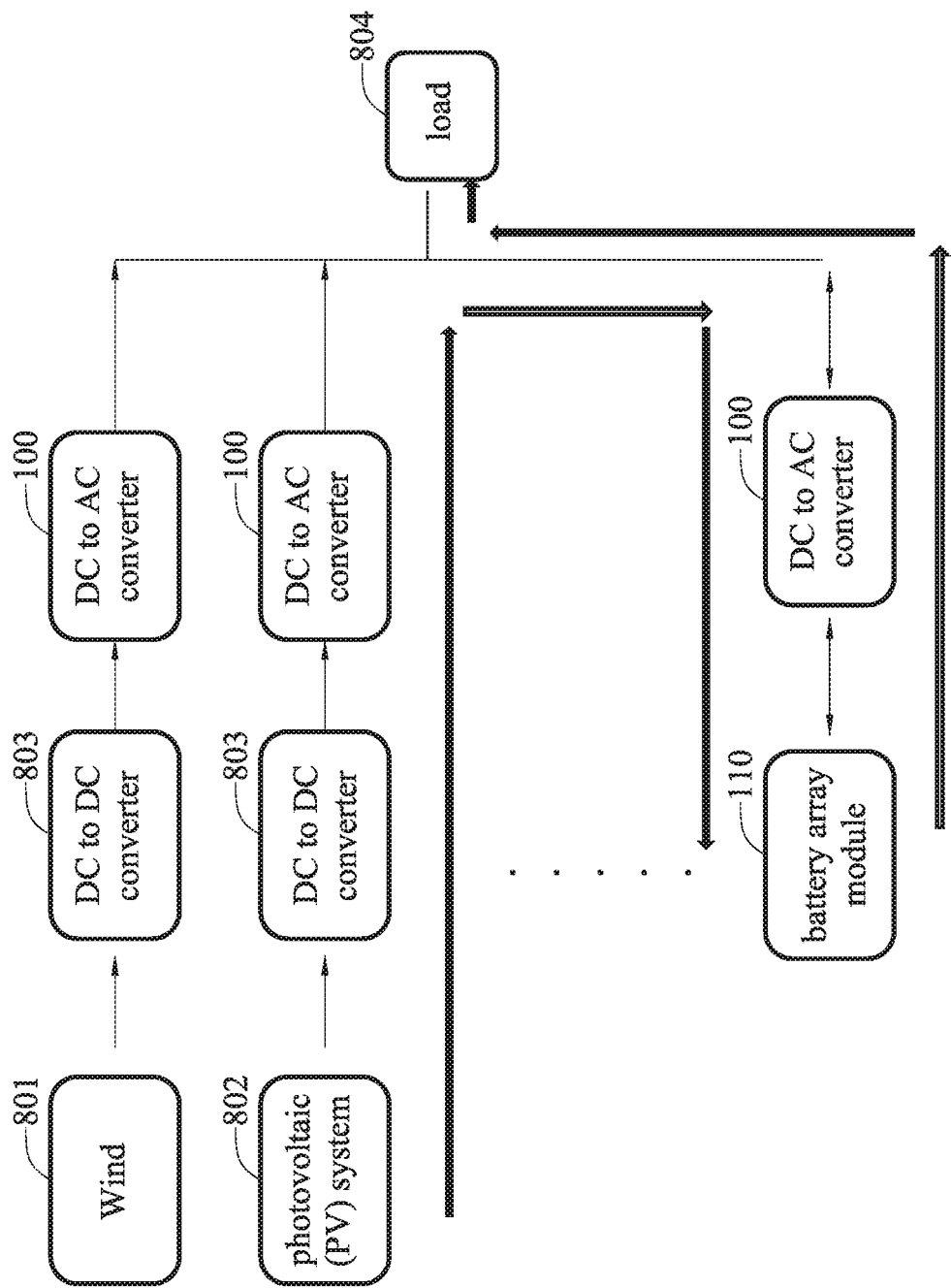
FIG. 8 shows a control method for a direct current (DC) to alternating current (AC) converter according to yet another embodiment of this disclosure.

According to yet another embodiment of this disclosure, referring to FIG. 8, when the DC to AC converter 100 is applied in a hybrid power generation system, a Wind 801 and a photovoltaic (PV) system 802 could act as the DC to AC converter 100 to provide power to a load 804 and to charge the battery array module 110 with excess power. When the power provided by the Wind 801 and the PV system is less than the requirement of the load 804, the battery array module 110 could discharge to make up the requirement to form a bi-directional DC to AC DC converter 100 and achieve the integration of energy storage and energy transfer.

In other words, the battery array module 110 is used to replace the existing DC to AC converters 803 to avoid power consumption. The battery array module 100 in the present disclosure could reconfigure voltage energy to be needed.

Therefore, according to the disclosed embodiments of the disclosure, the DC to AC DC converter 100 and the control method thereof are based on the control of the battery array module 110 at the DC end, and with the cooperation of power management, the DC to AC DC converter 100 have the advantages of low cost and simple control due to the easy generation of multiple phases.

It will be apparent to those skilled in the art that various modifications and variations can be made to the structure of the disclosed embodiments. It is intended that the specification and examples be considered as exemplars only, with a true scope of the disclosure being indicated by the following claims and their equivalents.

What is claimed is:

1. A direct current (DC) to alternating current (AC) converter, comprising:
a battery array module having a current mode switching converter and used to receive a DC signal, wherein the battery array module comprises one or more multiple battery modules, and wherein a plurality of battery string modules in series formed by the one or more multiple battery modules are controlled by the current mode switching converter, such that the plurality of battery string modules are electrically connected in parallel to form the battery array module;
a battery control module directly coupled to the battery array module having the current mode switching converter and used to control the battery array module having the current mode switching converter to reconfigure the DC signal from the battery array module and generate a multi-phase step signal;
a signal compensating module having an operating unit and a signal compensating unit, wherein a first signal is obtained by the operating unit to subtract a predetermined signal from the multi-phase step signal, and wherein the first signal compensated by the signal compensating unit is transmitted to the current mode switching converter of the battery array module to optimize the multi-phase step signal; and a polarity converter used to convert the multi-phase step signal from the battery control module into an AC signal output.

2. The DC to AC converter according to claim 1, wherein the polarity converter comprises a plurality of power switches, a plurality of diodes and a control unit.

3. The DC to AC converter according to claim 2, comprising a sensing module, wherein the sensing module comprises a current sensing unit and a voltage sensing unit.

4. The DC to AC converter according to claim 3, wherein the current sensing unit is used to control a plurality of battery string modules.

5. The DC to AC converter according to claim 3, wherein the voltage sensing unit is used to control each battery module in the battery string modules.

6. The DC to AC converter according to claim 1, wherein the battery control module generates the multi-phase step signal by increasing the quantity of the plurality of battery string modules and decreasing the quantity of the plurality of battery string modules.

7. The DC to AC converter according to claim 3, wherein the control unit controls the plurality of the power switches according to a current change of an inductor detected by the current sensing unit during a period, a DC voltage level of an output detected by the voltage sensing unit, and the first signal to be compensated.

8. The DC to AC converter according to claim 3, wherein the current sensing unit is implemented by a current sensor.

9. The DC to AC converter according to claim 3, wherein the current sensing unit is implemented by a Hall effect sensing element or a resistor.

10. The DC to AC converter according to claim 3, wherein the voltage sensing unit is implemented by a voltage sensor or a voltage divider circuit.

11. The DC to AC converter according to claim 2, wherein the control unit is implemented by a programmable microprocessor.

12. A control method for a direct current (DC) to alternating current (AC) converter, comprising:

receiving a DC signal by using a battery array module having a current mode switching converter, wherein the battery array module comprises one or more multiple battery modules, and wherein a plurality of battery string modules in series formed by the one or more multiple battery modules are controlled by the current mode switching converter, such that the plurality of battery string modules are electrically connected in parallel to form the battery array module;

reconfiguring the DC signal from the battery array module and generating a multi-phase step signal by controlling the battery array module having the current mode switching converter with a battery control module, wherein the battery control module having the current mode switching converter is directly coupled to the battery array module, wherein the DC to AC converter comprises a signal compensating module having an operating unit and a signal compensating unit, and wherein a first signal is obtained by the operating unit to subtract a predetermined signal from the multi-phase step signal;

transmitting the first signal compensated by the signal compensating unit to the current mode switching converter of the battery array module to optimize the multi-phase step signal; and converting the multi-phase step signal from the battery control module into an AC signal output by a polarity converter.

13. The control method for the DC to AC converter according to claim 12, wherein the DC to AC converter comprises a sensing module, and wherein the sensing module comprises a current sensing unit and a voltage sensing unit.

14. The control method for the DC to AC converter according to claim 13, wherein the current sensing unit is used to control a plurality of battery string modules.

15. The control method for the DC to AC converter according to claim 13, wherein the voltage sensing unit is used to control each battery module in the battery string modules.

16. The control method for the DC to AC converter according to claim 12, wherein the battery control module generates the multi-phase step signal by increasing the quantity of the plurality of battery string modules and decreasing the quantity of the plurality of battery string modules.

* * * * *